United States Patent [19]
Watanabe

[11] Patent Number: 4,777,533
[45] Date of Patent: Oct. 11, 1988

[54] IMAGE FORMING APPARATUS

[75] Inventor: Junji Watanabe, Yokohama, Japan

[73] Assignee: Kabushiki Kaisha Toshiba, Kawasaki, Japan

[21] Appl. No.: 1,251

[22] Filed: Jan. 7, 1987

[30] Foreign Application Priority Data

Jan. 28, 1986 [JP] Japan ................................ 61-14652

[51] Int. Cl.⁴ .............................................. H04N 1/04
[52] U.S. Cl. .................... 358/286; 358/293; 358/296; 346/76 PH
[58] Field of Search ............... 358/256, 285, 286, 293, 358/294, 296, 297, 299; 346/76 PH

[56] References Cited

U.S. PATENT DOCUMENTS

| | | | |
|---|---|---|---|
| 4,636,871 | 1/1987 | Oi | 358/286 |
| 4,670,795 | 6/1987 | Yamanishi | 358/296 |
| 4,695,896 | 9/1987 | Yamanishi | 346/76 PH |
| 4,695,897 | 9/1987 | Watanabe | 346/76 PH |
| 4,702,631 | 10/1987 | Watanabe | 346/76 PH |

FOREIGN PATENT DOCUMENTS 56-62476  5/1981  Japan .................................. 358/286

Primary Examiner—Edward L. Coles, Sr.
Attorney, Agent, or Firm—Cushman, Darby & Cushman

[57] ABSTRACT

An image forming apparatus comprises a housing having an upper wall and a bottom wall, a document table provided on the outer surface of the upper wall for placing a document thereon, a scanner for scanning the image of the document placed on the document table, a platen for supporting and transporting an image-receiving material, a recording head disposed facing the transporting means, and moving mechanism for moving the recording head reciprocally in the direction perpendicular to the transporting direction of the image-receiving material. The image forming apparatus further includes a cassette enclosing an image forming material disposed between the recording head and image-receiving material. The cassette is disposed vertically, exposed from the upper wall of the housing, and moved with the recording head by the moving means. The range of the cassette moving is covered a box like cover.

5 Claims, 10 Drawing Sheets

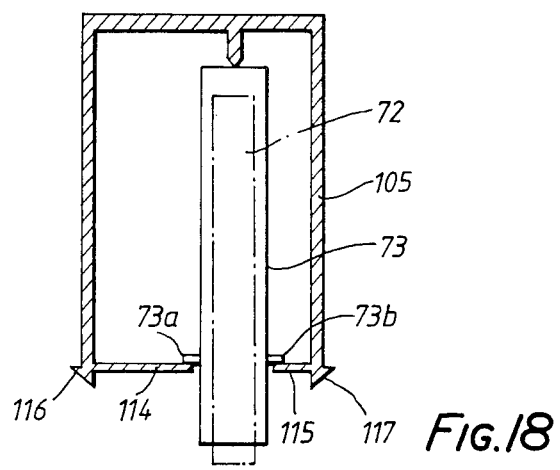
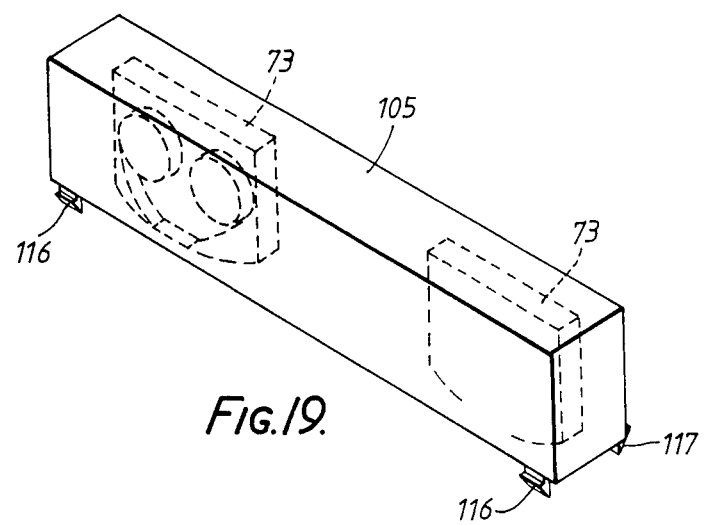

IMAGE FORMING APPARATUS

BACKGROUND OF THE INVENTION

1. Field of the Invention

The present invention relates to an improvement of an image forming apparatus auch as a scanner printer, etc.

2. Description of the Prior Art

Conventionally, this type of image forming apparatus has a construction such as shown in FIGS. 1 and 2.

FIG. 1 shows a scanner printer. A document table (transparent glass) 2 is provided on the upper surface of a housing 1 for placing documents. On one side of document table 2, there is a positioning scale 3 which serves for positioning of a document A. While above document table 2 there is a document cover 4 whose rear edge is pivotally mounted by a shaft not shown, so permitting it to open or to close on document table 2.

An inlet 6 and an outlet 7 by which paper (image-receiving material) P may enter and leave a serial printer unit (image forming means) 5 that is described below are provided at the upper surface of the rear side of housing 1. A control panel 8 is provided at the upper surface of the front side of housing 1.

In housing 1, a scanner unit (image reading means) 9 for reading the image of a document. A placed on document table 2 is provided and serial printer unit 5 which forms images on paper P on the basis of informing read by scanner unit 9 is provided. Scanner unit 9 is located below document table 2 and serial printer unit 5 is located to the rear side of scanner unit 9.

Scanner unit 9 consists of a sensor unit (image pickup means 10 which picks up the image of document A placed on document table 2 and a drive mechanism (not shown) by which sensor unit 10 is moved reciprocally in a front to rear direction (X61 direction) and to the left and right (Y1 direction).

The structure of sensor unit 10 is such that a document surface is illuminated by a spot light source and light reflected from it is led to and focussed at an image sensor constituted by a charge coupled device (CCD) via a mirror and a lens (optical focussing element).

Serial printer unit 5 has a construction as shown in FIG. 2. A cylindrical platen (image-receiving material supporting means) 11 supports paper P and transports it. Platen 11 is driven at successive set pitches by a pulse motor 13 acting via a reduction gear train 12. In front of and facing platen 11, a thermal print head 14 as a recording head is provided. Thermal print head 14 can be moved parallel to the axis of platen 11 by a head moving means.

In more detail, a shaft 15 is provided parallel to platen 11 and a carriage 16 is slidably mounted on shaft 15. Carriage 16 is connected to a timing belt 17 which is passed around between pulleys 18 and 18 that are provided at near both ends of shaft 15. One of pulleys 18 can be driven by a pulse motor 20 acting via a reduction gear train 19. Carriage 16 carrying thermal print head 14 is moved reciprocally along a line parallel to the axis of platen 11 by the rotation of pulse motor 20.

Thermal print head 14 has heating elements (not shown) which are arrayed in a direction that intersects the line of platen 11 axis at right angles, i.e., parallel to the direction of rotation of platen 11.

A flexible cable 21 has one end fixed by a holder not shown to carriage 16, and a connector member 22 provided at its other end is connected to a connection element (not shown) that is located in the approximate centre of the path along which carriage 16 moves. The heating elements of thermal print head 14 are connected to a head drive circuit (not shown) via the wiring pattern of flexible cable 21.

A paper guide 23 and a paper hold-down roller (not shown) are mounted to the outer periphery portion of platen 11.

If paper P is heat-sensitive paper, images are formed by bringing thermal print head 14 directly against it. If it is plain paper, etc., a ribbon cassette 24 is mounted at the rear side of housing 1 as shown in FIG. 1 and images are produced with a thermal transfer ink ribbon 25 interposed between paper P and thermal print head 14, as shown in FIG. 2.

Since the arrangement in the above described conventional apparatus is one in which thermal print head 14 is located in front of platen 11, ribbon cassette 24 must be mounted at the rear side of housing 1 as shown in FIG. 1. Or, alternatively, it must be set in a portion of housing 1 interior that is in front of thermal print head 14, i.e., it must be set together with a winding mechanism on carriage 16 for moving thermal head 14.

Both these arrangements hinder production of more compact apparatus, since in the former arrangement in which ribbon cassette is mounted at the rear side of housing 1, the dimensions going towards the rear are larger when a ribbon cassette is in place, while in the latter arrangement in which ribbon cassette is mounted on carriage 16, the depth dimension of housing 1 itself becomes large.

SUMMARY OF THE INVENTION

It is an object of the invention to provide an image forming apparatus which is construction such that the problem mentioned above are solved, which is possible to have a compact structure with a small front-to-rear dimension.

According to one aspect of the present invention, there is provided an image forming apparatus including:

a housing having an upper wall and a bottom wall;

a document table provided on the outer surface of the upper wall for placing a document thereon;

means for scanning the image of the document placed on the document table;

means for supporting and transporting an image-receiving material;

a recording head disposed facing the supporting means;

means for moving the recording head reciprocally in the direction perpendicular to the transporting direction of the image-receiving material;

a cassette enclosing an image forming material disposed between the recording head and image-receiving material, the cassette is disposed vertically, exposed from the upper wall of the housing, and moved with the recording head by the moving means; and means for covering the range of the cassette moving.

BRIEF DESCRIPTION OF THE DRAWINGS

These and other objects and advantages of this invention will become more apparent and more readily appreciated from the following detailed description of the presently preferred exemplary embodiments, taken in conjunction with the accompanying drawings, of which:

FIGS. 3 through 19 show an embodiment of an image forming apparatus according to the present invention, in which;

FIG. 3 is a side view, partially cut away, showing the configuration of serial printer unit;

FIG. 4 is an external perspective view;

FIG. 5 is an external perspective view, partially cut away;

FIG. 6 is a schematic view of internal construction;

FIG. 7 is a plan view of a drive mechanism;

FIG. 8 is a front view, in longitudinal section, showing a sensor unit portion;

FIG. 9 is a plan view of FIG. 7;

FIG. 10 is a side view, in longitudinal section, of FIG. 7;

FIG. 11 is a plan view showing reading width;

FIG. 12 is a plan view for explaining the reading process;

FIG. 13 is a perspective view showing a serial printer unit;

FIG. 14 is a front view showing a thermal print head;

FIG. 15 is a side view showing the thermal print head shown in FIG. 14;

FIG. 16 is a front view showing a ribbon cassette set to a serial printer unit;

FIG. 17 is a plan view showing a ribbon cassette and a thermal print head;

FIG. 18 is a longitudinal sectional view showing a ribbon cassette covered with a cover; and FIG. 19 is a perspective view showing a ribbon cassette covered with a cover.

DETAILED DESCRIPTION OF THE PREFERRED EMBODIMENTS

An embodiment of the present invention will now be described with reference to FIGS. 3 through 19.

Figure 1:
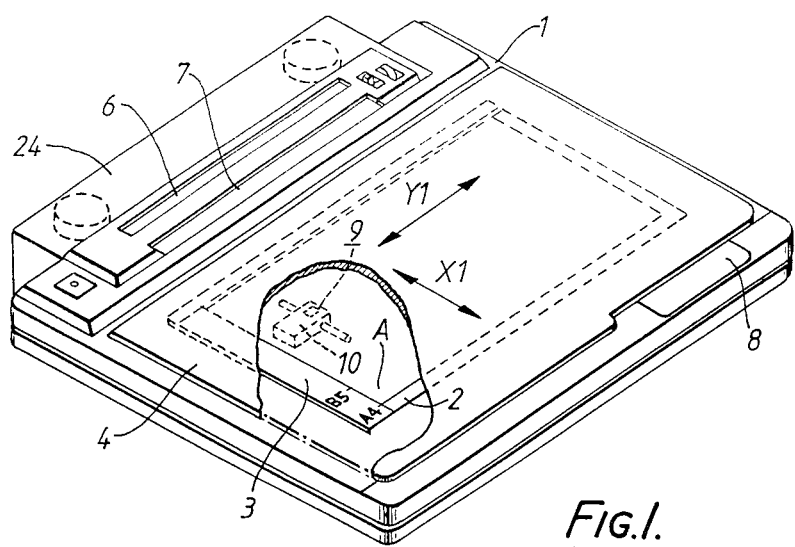
FIG. 1 is an external perspective view partially cut away, showing a conventional apparatus.
Figure 2:
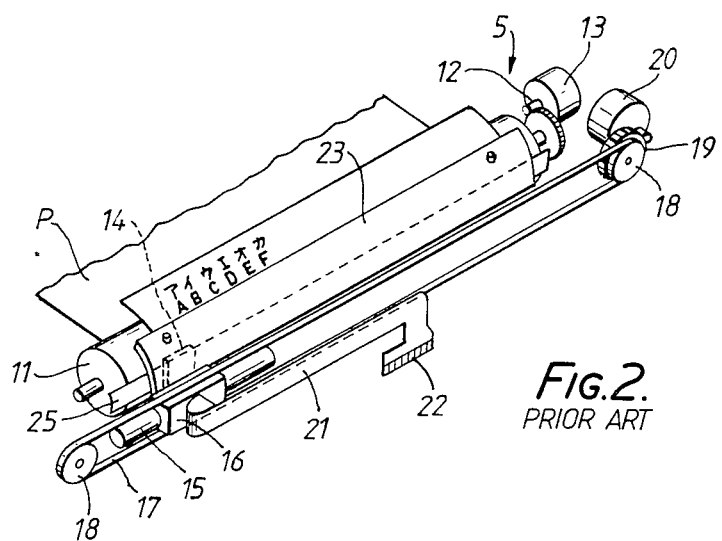
FIG. 2 is a schematic perspective view of serial printer unit in this conventional apparatus.
Figure 3:
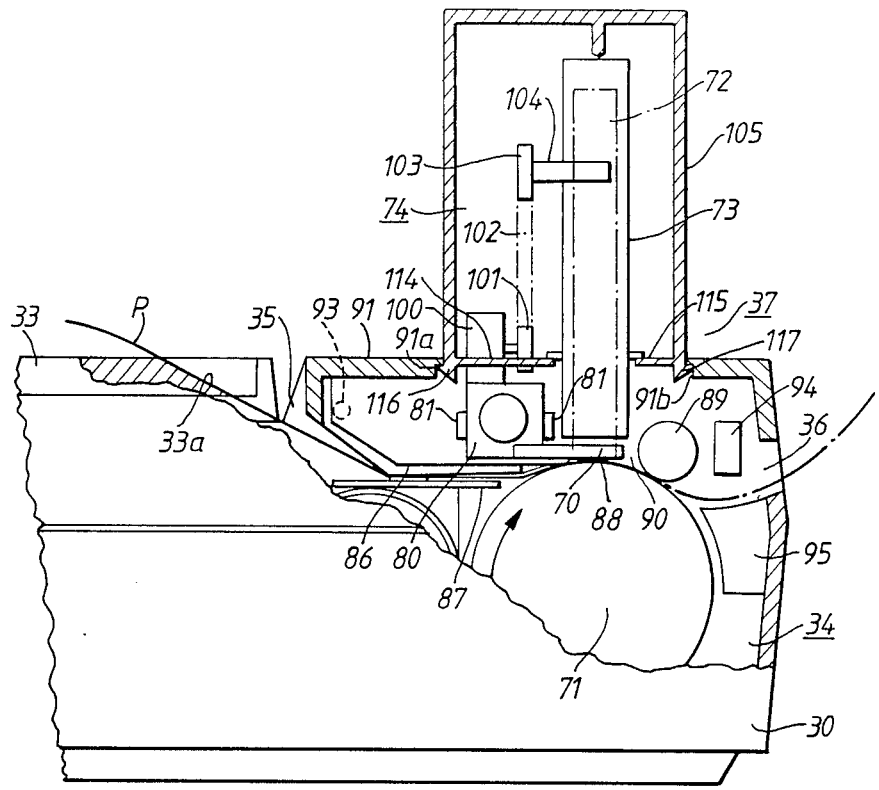
Figure 4:
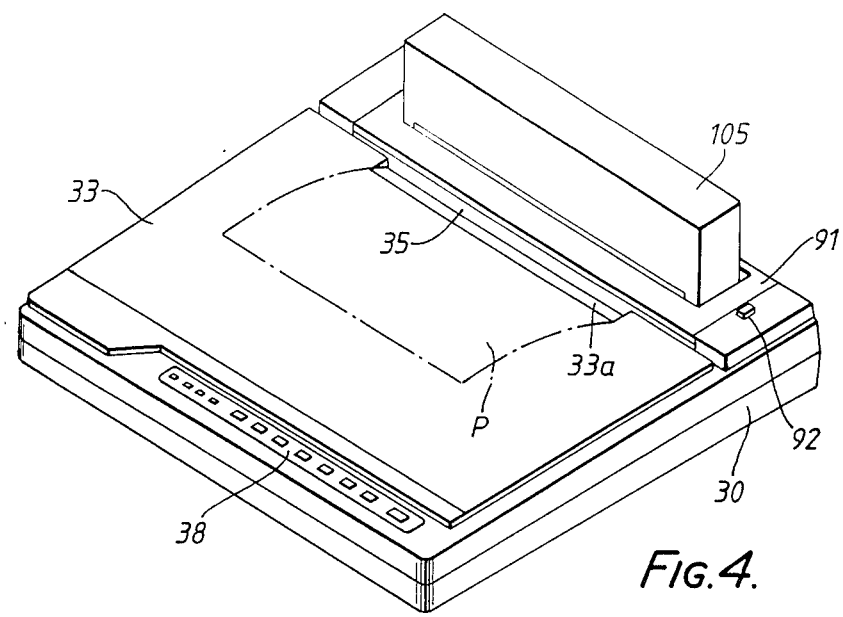
Figure 5:
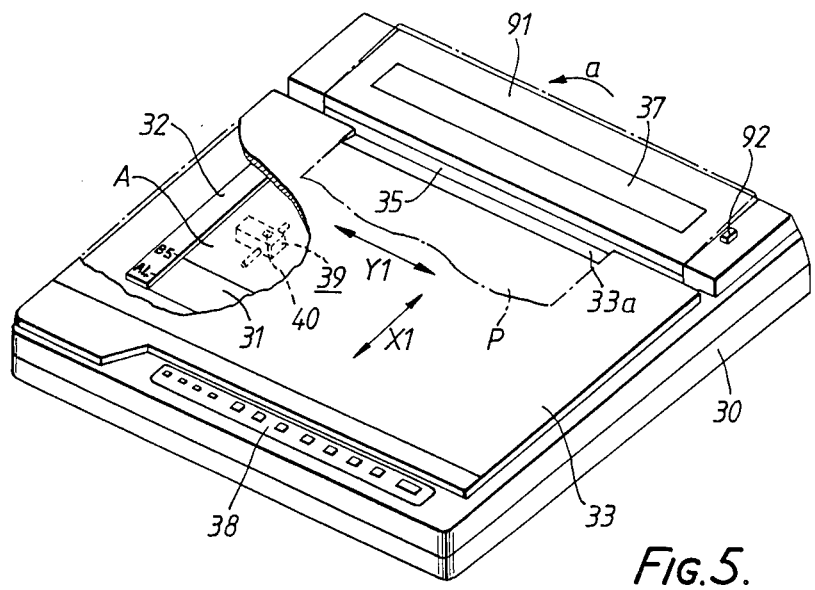

FIG. 3 shows the main structural parts of a scanner printer and FIGS. 4 and 5 are external views of the printer. A housing 30 is formed in the flat box like and has an upper wall and bottom wall. A document table (transparent glass) 31 is provided on the upper surface of the upper wall of housing 30 for placing documents. On one side of document table 31, there is a positioning scale 32 which serves for positioning of a document A. While above document table 31 there is a document cover 33 whose rear edge is pivotally mounted by a shaft not shown, so permitting it to open or to close on doounment table 31.

An inlet 35 and an outlet 36 by which paper (image-receiving material) P may enter and leave a serial printer unit 34 that is described below are respectively provided at the rear side of housing 30 upper surface and in the rear surface of housing 30. A ribbon cassette loading stage 37 is provided at the rear side of inlet 35. A control panel 38 comprising a print switch, stops itch, paper feed switch and copying range specifying switch, etc. a provided at the front edge of housing 1 upper surface. At the rear side of dooument oover 33 there is a taper portion 33a which is for guiding insertion of paper P and allows copy paper P to be guided smoothly to inlet 35 of serial printer unit 34. The sides of taper portion 33a constitute transverse guides for insertion of paper P.

A scanner unit (image reading means) 39, which reads the image of a document A placed on document table 31, and serial printer unit 34, which forms an image on paper P on the basis of information read by scanner unit 39, are provided inside housing 30. Scanner unit 39 is located below document table 31 and serial printer unit 34 is located to the rear of scanner unit 39.

Figure 6:
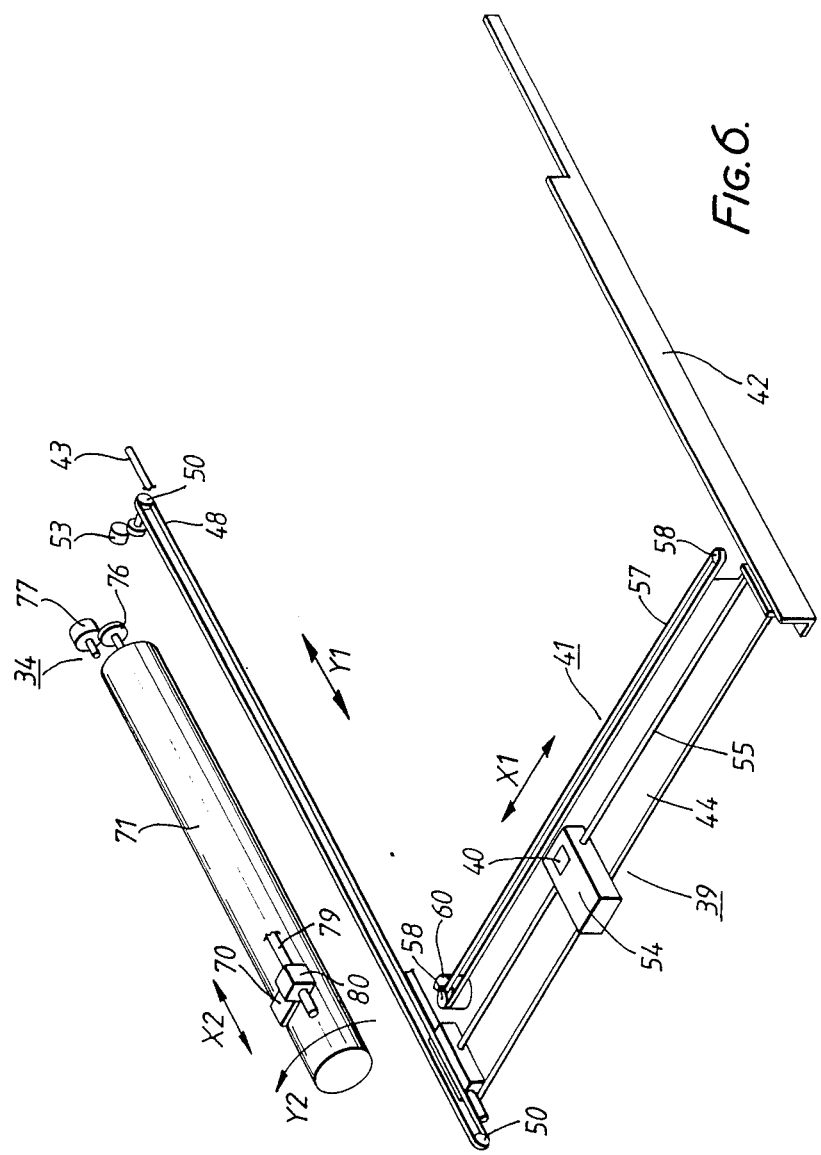

As shown in FIG. 6, scanner unit 39 consists of a eensor unit (image pickup means) 40 which picks up the image of a document on document table 31 and a drive mechanism (41) which causes reciprocal movement of sensor unit 40 in the X1 direction (first direction), going from front to rear, and in the Y1 direction (second direction), going from left to right.

Figure 7:
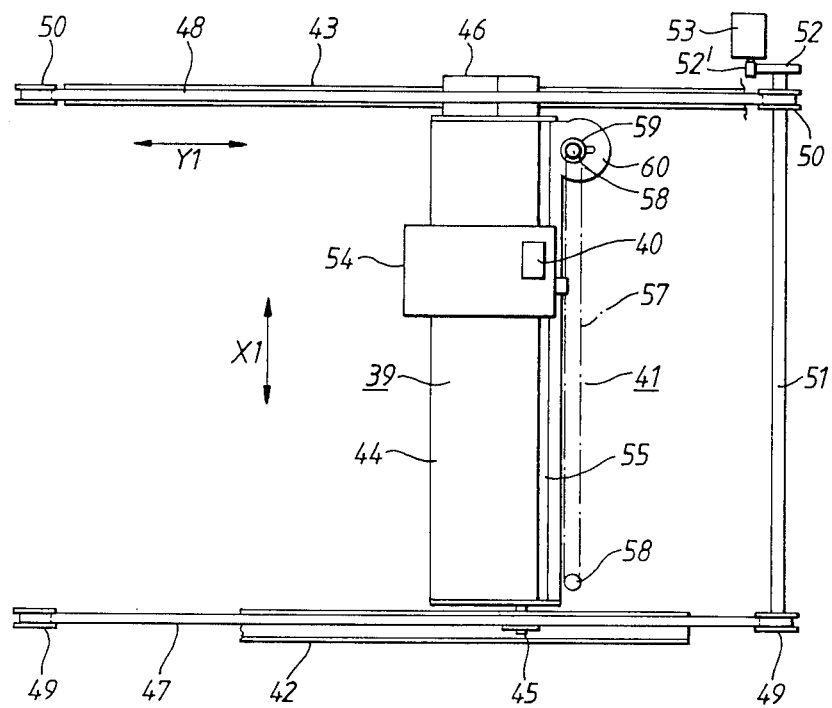

Scanner unit 3 is constructed in the manner shown in FIGS. 6 and 7. That is, a guide rail 42 going in the X1 direction is provided along the front side of scanner unit 39 inside housing 30 and a guide shaft 43, also going in the Y1 direction, is provided along its rear side. A first carriage 44 straddles the space between guide rail 42 and guide shaft 43. The front edge of first carriage 44 is movable on guide rail 42 via a roller 45 and its rear edge is slidably supported on guide shaft 43 by a slider 46, first carriage 44 thus being freely movable in the Y1 direction. The front edge and rear edge of first carriage 44 are respectively connected to timing belts 47 and 48 which respectively pass around between a pair of pulleys 49 and 49 provided at near the both ends of guide rail 42 and a pair of pulleys 50 and 50 provided at near both ends of guide shaft 43. Pulleys 49 and 50 at one end are mounted on both ends of a shaft 51 which is driven by a first pulse motor 53 acting via a train of reduction gears 52 and 52', the arrangement thus being such that drive of first pulse motor 53 causes first carriage 44 to move reciprocally in the Y1 direction.

A second carriage 54 is supported on first carriage 44. As shown in FIG. 7, second carriage 54 has its right-hand side slidably supported on a shaft 55 that is provided going in the X1 direction on first carriage 44 and its left-hand side slidably supported on the edge of first carriage 44 via an engagement recess portion 56 (FIGS. 8 and 10), whereby it can move freely in the X1 direction. The right-hand side of second carriage 54 is connected to a timing belt 57 that passes around between pulleys 58 and 58 which are located at the front and rear side of first carriage 44 and one of which is driven by a second pulse motor 60 acting via a reduction gear train 59. Thus, drive of second pulse motor 60 causes second carriage 54 to move reciprocally in the X1 direction.

Figure 8:
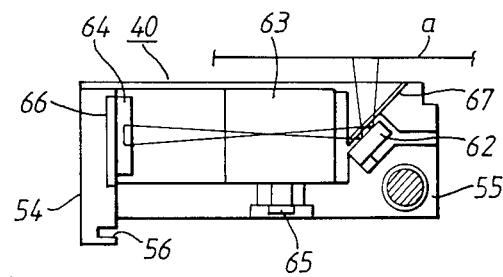
Figure 9:
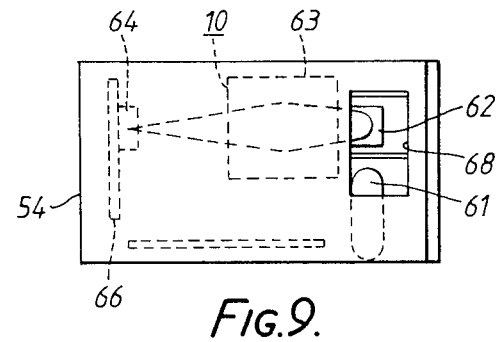

Sensor unit 40 is mounted on second carriage 54 and, as shown in FIGS. 7 through 9, has a construction in which a document surface a is illuminated by a spot light source 61 and light reflected from this surface goes successively via a mirror 62 and a lens (optical focussing element) 63 to be led to and focussed at an image sensor 64 constituted by a charge coupled device (CCD). A screw 65 is operatively provided to lens 63 for adjusting the focus of lens 63. When screw 65 is turned, it causes lens 63 to move along the optical axis. Image sensor 64 is mounted directly on a circuit board 66 so as to minimize noise effects. Mirror 62 is held by a holder 67. Above mirror 62, a window 68 is provided to permit the passing light from document surface a.

Figure 10:
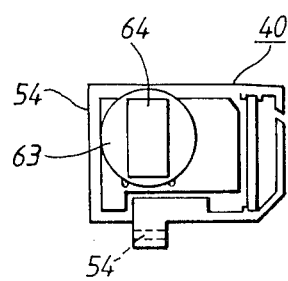
Figure 11:
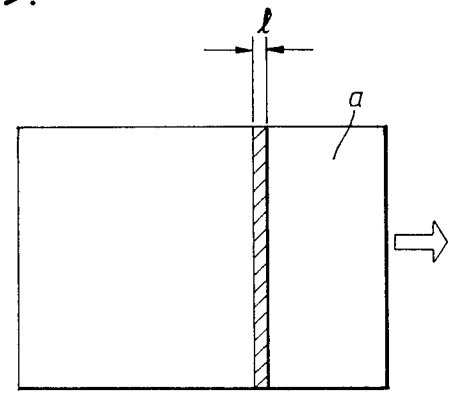

Image sensor 64 comprises a plural bit (8 bit) sensor element. First carriage 44 carrying image sensor 64 is moved in the X1 direction by drive mechanism 41. As a result, a document image is read one line at a time, each line being the width l of image sensor 64 bits, as shown in FIG. 10.

Figure 12:
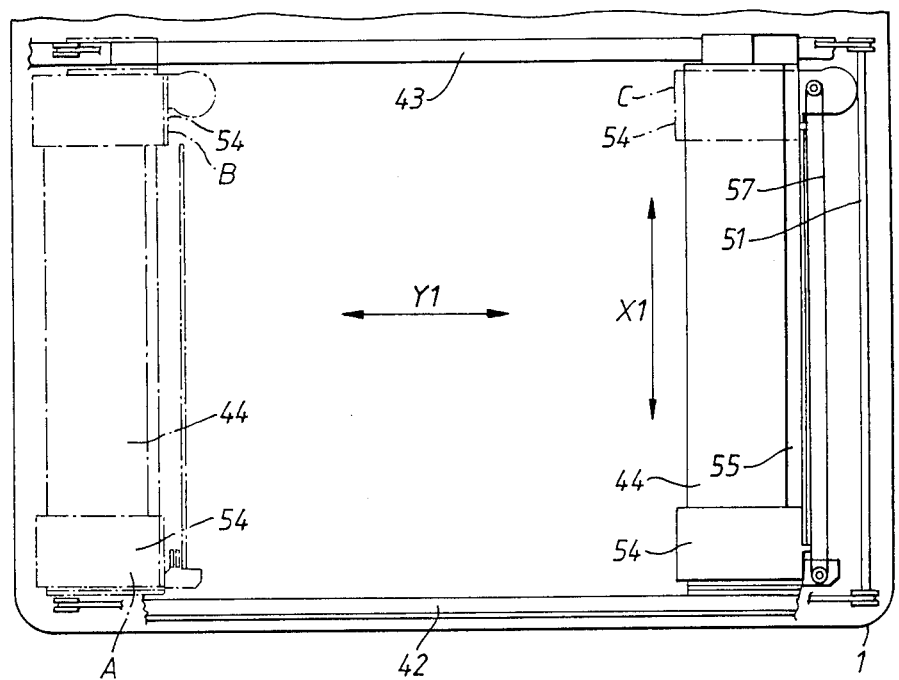

As shown in FIG. 12, reading starts at a front left position A and is effected going in the X1 direction up to a rear position B. On completion of this reading there is a return to the front side and during this return movement, sensor unit 40 is shifted a line reading width 1 to the right. Repetition of this action results in reading being effected up to a rear right position C.

Figure 13:
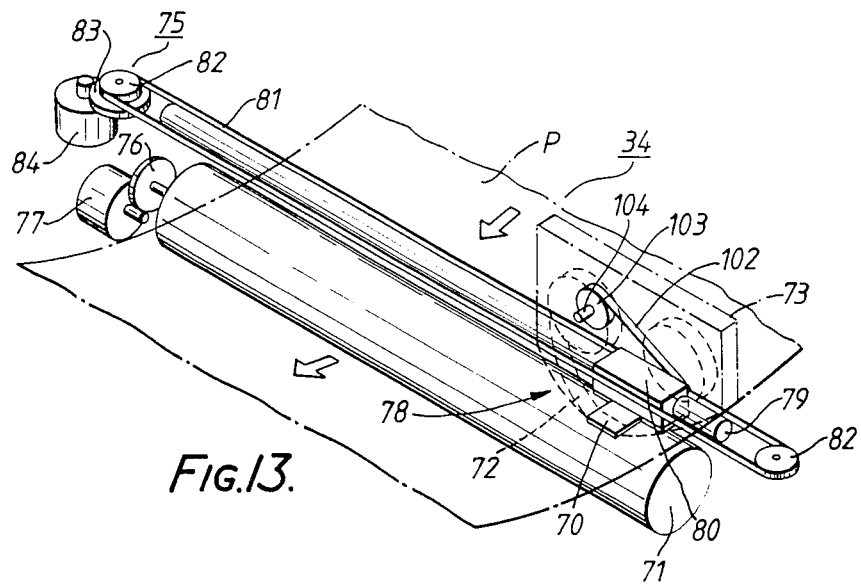

As shown in FIGS. 3, 6 and 13, serial printer unit 34 consists of a recording head in the form of a thermal print head 70, a cylindrical platen (image-receiving material supporting means) 71, a ribbon cassette 73 with a thermal transfer ink ribbon 72 for effecting ink transfer, a winding mechanism 14 for winding thermal transfer ink ribbon 72 and a displacement mechanism 75 for moving thermal print head 70, ribbon cassette 73 and winding mechanism 74.

In more detail platen 71 serves to simultaneously support and transport paper P and is driven successive set pitches by a pulse motor 77 acting via a reduction gear train 76. Thermal print head (recording head) 70 faces downwards towards the upper surface of platen 71 and can be moved parallel to the axis of platen 71 by displacement mechanism 75 by the following arrrangement. A carriage 80 which is slidable on a guide shaft 79 that is installed parallel to the upper surface of platen 71 is connected to a timing belt 81 disposed around guide pulleys 82 and 82 which are located near opposite ends of guide shaft 79 and one of which is driven by a pulse motor 84 acting via a reduction gear train 83.

Figure 14:
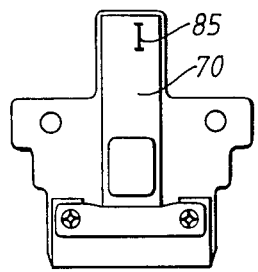
Figure 15:
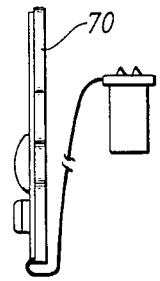

Thermal print head 70 is mounted on carriage 80 and can be moved parallel to the axis of platen 71 and along its upper surface by drive supplied by pulse motor 84. As shown in FIGS. 14 and 15, thermal print head 70 has heating elements 85 arrayed in a direction that is normal to the axis of platen 71, i.e., that is parallel to the direction of rotation of platen 71. Printing is effected following on from and at the same speed as reading by scanner unit 39 and the printer width is matched to the reading width 1 (FIG. 11) of scanner unit 39. At a peripheral portion of platen 71, there are paper guides 86 and 87 by which paper P is guided from paper inlet 35 to an image formation station 88 between platen 71 and thermal print head 70. At a location that is further on than image formation station 88 in the direction of paper ransport, there is paper press-down roller 89 which presses paper P against platen 71, and further on than paper press-down roller 89 in the direction of paper transport, there is a paper guide 95 which guides paper P to paper outlet 36. These elements together define a transport route 90 going from paper inlet 35 to paper outlet 36.

On depression of push button 92 in a rear right-hand side portion of the upper surface of housing 30, spring or similar force causes a top plate (casing body) 91 that constitutes the top surface of serial printer unit 34 to pivot about a pivot point 93 at paper inlet 35 end of top plate 91 and be pivotally displaced anticlockwise as shown in FIG. 5 (in the direction of arrow a). Upper paper guide 86, thermal print head 70 and paper press-down roller 89 are moved upwards integrally with top plate 9, so opening paper transport path 90 and permitting paper P that has been inserted via paper inlet 35 to be passed smoothly through image forming station 88. The leading edge of paper P is positioned by coming against a stopper 94 located to the rear of paper press-down roller 89, further insertion being prevented when it contacts this stopper 94.

In setting of paper P in place, its side edges are positioned by the sides of taper portion 33a of document cover 33 and paper P is easily set parallel to platen 71 by simply being inserted, with the positions of its side edges thus controlled, until it comes against stopper 94.

Winding mechanism 74 is installed at the upper surface of carriage 80 and can be moved together with thermal print head 70. Winding mechanism 74 consists of a pulse motor 100, a drive pulley 101 that is rotated by pulse motor 100, a belt 102 to which rotation of drive pulley 101 is transmitted, a follower pulley 103 which is rotated by belt 102 and a rotation shaft 104 which is connected to follower pulley 103 and is therefore rotated by drive produced by pulse motor 100.

Figure 16:
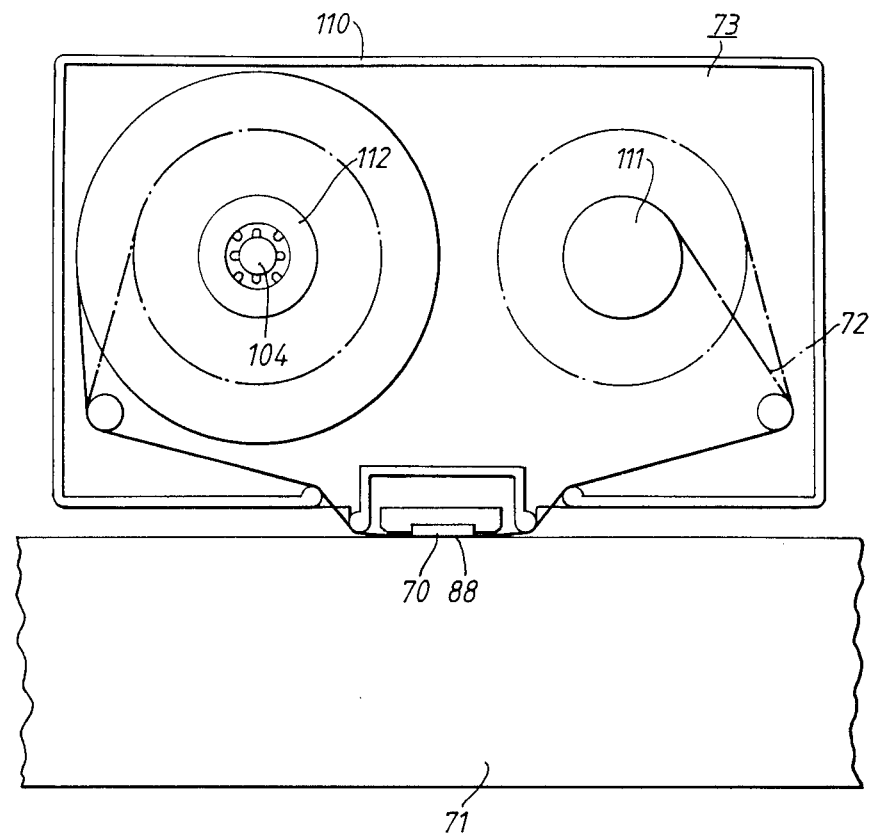
Figure 17:
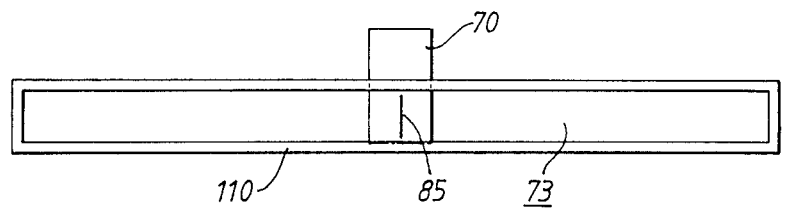

As shown in FIGS. 16 and 17, ribbon cassette 73 has a construction in which a feed-out reel 111 and a take-up reel 112 are accommodated in a cassette housing 110 and an intermediate portion of thermal transfer ink ribbon 72 is exposed at the lower surface side of cassette housing 110. Thermal transfer ink ribbon 72 is gradually wound up through rotation of take-up reel 112 by drive shaft 104.

Ribbon cassette 73 is installed so that it is movable together with and disposed vertically above thermal print head 70 as shown in FIG. 13 by being set on an extension portion not shown of carriage 80.

As shown in FIG. 18, projections 73a and 73b of ribbon cassette 73 are supported by internal projections 114 and 115 of a cover 105 formed in the box like. This arrangement permits ribbon cassette 73 to move freely inside cover 105.

Cover 105 is mounted on ribbon cassette mounting section 37 and ribbon cassette 73 set on a projection portion (not shown) of carriage 80 by engagement tabs 116 and 117 of cover 105 shown in in FIGS. 18 and 19 being respectively engaged with engagement parts (connection means) 91 a and 91bb of top plate 91 as shown in FIG. 3. In this situation, thermal transfer ink ribbon 72 of ribbon cassette 73 is set between thermal print head 70 and platen 71 (paper P is set between thermal transfer ink ribbon 72 and platen 71).

As a result, when ribbon cassette 73 has been set on the projection portion (not shown) of carriage 80, the range over which ribbon cassette 73 moves is covered by cover 105.

If paper P is heat sensitive paper, images are formed by bringing thermal print head 70 directly against it, without mounting ribbon cassette 73. If paper P is plain paper, etc., ribbon cassette 73 is mounted on ribbon cassette mounting section 37 defined at a rear portion of housing 30 as shown in FIG. 3 and images are formed after first interposing thermal transfer ink ribbon 72 between paper P and thermal print head 70.

As described above, the apparatus is one in which a thermal print head is installed so that it faces the upper side of a platen and is reciprocally movable in a direction which is normal to the direction in which paper is transported by the platen. A ribbon cassette is optionally provided and set so that it moves together with the thermal print head. The ribbon cassette having a thermal transfer ink ribbon accommodated in it interposed between the thermal print head and paper, is vertically set above the thermal print head. The range over which the ribbon cassette moves is covered by a cover. The front to rear dimension of the apparatus as a whole can therefore be made smaller. The ribbon cassette is easily mounted on the ribbon cassette mounting section, thus reducing the possibility of incorrect mounting. In addition, the arrangement is such that the cassette cannot be touched while it is moving.

The thermal transfer ink ribbon in the ribbon cassette may be a ink ribbon in Which Y (yellow), M (magenta) and C (cyan) or Y (yellow), M (magenta), C (cyan) and B (black) inks are successively disposed in the direction of lines. In these cases, color ink transfer can be effected.

What is claimed is:

1. An image forming apparatus comprising:
   a housing having an upper wall and a bottom wall;
   a document table provided on the outer surface of the upper wall for placing a document thereon;
   means for scanning the image of the document placed on said document table;
   means for supporting and transporting an image-receiving material;
   a recording head disposed facing said supporting means;
   means for moving said recording head reciprocally in the direction perpendicular to the transporting direction of the image-receiving material;
   a cassette enclosing an image forming material disposed between said recording head and image-receiving material, said cassette is disposed vertically, exposed from the upper wall of said housing, and moved with said recording head by said moving means; and
   means for covering the range of said cassette moving.

2. An image forming apparatus according to claim 1, wherein said recording head includes a thermal print head.

3. An image forming apparatus according to claim 1, wherein said supporting means includes a cylindrical platen.

4. An image forming apparatus according to claim 1, wherein said covering means includes:
   a box like cover;
   engagement tabs formed to said cover or engaging with engagement parts formed to said upper wall of housing; and
   internal projections formed inside of said cover for supporting said cassette and permitting said cassette to move freely inside of said cover.

5. An image forming apparatus according to claim 2, wherein said image forming material of said cassette comprises a thermal transfer ink ribbon.

* * * * *